J. ALLONAS, dec'd.
M. D. HARTER, Executor.
Thrashing-Machine.
No. 217,039.    Patented July 1, 1879.
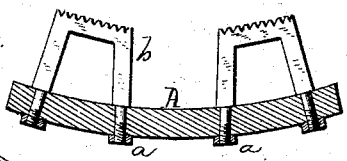
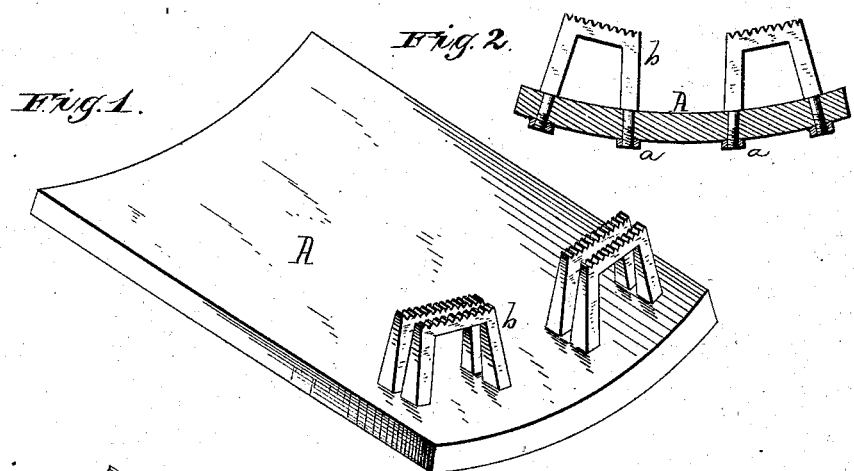
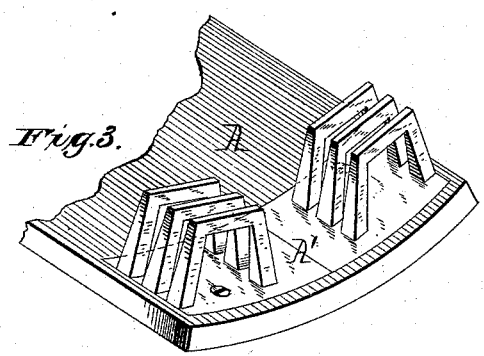
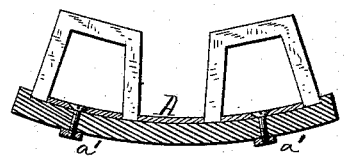
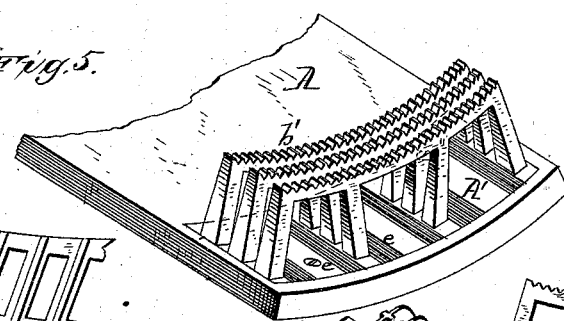
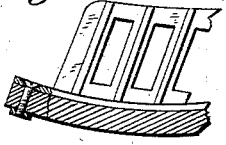
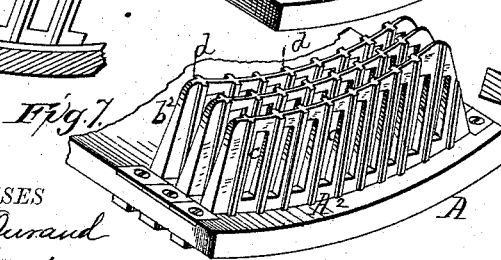
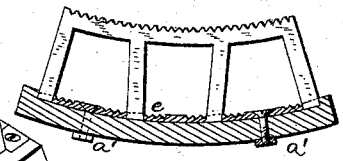
WITNESSES
Franck L. Durand
John G. Center
INVENTOR
Joseph Allonas
A. M. Smith
By his Attorney

UNITED STATES PATENT OFFICE.

JOSEPH ALLONAS, OF MANSFIELD, OHIO; M. D. HARTER, EXECUTOR OF SAID ALLONAS, DECEASED, ASSIGNOR TO THE AULTMAN & TAYLOR COMPANY, OF SAME PLACE.

IMPROVEMENT IN THRASHING-MACHINES.

Specification forming part of Letters Patent No. 217,039, dated July 1, 1879; application filed November 20, 1878.

*To all whom it may concern:*

Be it known that I, JOSEPH ALLONAS, of Mansfield, county of Richland, State of Ohio, have invented certain new and useful Improvements in Thrashing-Machines, of which the following is a full, clear, and exact description, reference being had to the accompanying drawings, making part of this specification, in which—

Figure 1 is a perspective view of a portion of a thrasher-concave, showing a loop or staple form of the teeth made and adapted to be applied separately to the concave; and Fig. 2 represents a section through the same. Fig. 3 is a view similar to Fig. 1, showing the teeth formed in groups upon base-plates, or adapting them to be applied to the concave in sections. Fig. 4 is a section through Fig. 3; and Figs. 5, 6, 7, and 8 are similar views, showing modifications in the form of the teeth, and of the sections of concave to which they are applied.

The invention relates to a novel construction of thrashing-machine teeth, and to the manner of applying the same to the thrasher concave or bed; and consists, first, in arranging the teeth in groups upon sectional base or wear plates, through which they are connected with the thrasher concave or bed; and, second, in making the teeth in the form of a slotted plate, or a series of loops or staples arranged in line, with the uprights or slots arranged obliquely to the face of the bed or concave, as hereinafter explained.

In the accompanying drawings like letters of reference, as far as practicable, refer to like parts in all the figures.

A represents the thrasher-concave, or a portion thereof; and $b$, the teeth. These teeth are made in the form of open angular loops or staples, provided with roughened, corrugated, or toothed faces, and when made separately, as shown in Figs. 1 and 2, have their arms or legs extended in rounded form and provided with screw-threads, adapting them to be passed through perforations in the concave, and secured in place by nuts $a$, as shown in Fig. 2.

For the purpose of facilitating the application and the removal and replacing or renewal of the teeth, I prefer to arrange them in groups or series of two, three, or more, either formed in one piece with or permanently secured to base-plates or small sections $A^1$ of concave, conforming in shape to and adapted to be readily secured in place on the inner face of the concave A by bolts and nuts, as shown at $a'$, Figs. 4 and 6.

In the illustrations Figs. 3 and 4, the teeth are made in the single loop or staple form, and arranged side by side in a group on a single base-plate, while in Figs. 5 and 6 the teeth $b^1$ are extended into a series of loops, two, three, or more, in one piece or tooth, extending together with their base-plate the whole length from front to rear of the concave A, or section thereof, to which they are to be applied, and several of these are grouped side by side on the same base-plate $A^1$.

In Figs. 7 and 8 the loops or open teeth are shown set obliquely to the face of the concave, and instead of being made in the form of loops open at the bottom, as in the other figures, are made more in the form of obliquely-slotted plates secured at their bases to base strips or sections $A^2$, extending either wholly or only partly across the concave from front to rear, one strip for each line or series of loops, as shown.

In this last-named construction, the teeth $b^2$ may be formed from a thin plate of metal, provided between the slots or openings $c$ with stiffening-ribs $d$, giving them not only increased stiffness and rigidity, but increased efficiency in their action on the grain, the ribs or uprights serving to obstruct the passage of and to beat out the grain in the movement of the straw by them.

The concave A may be recessed to receive the sections or base-plates $A^1$, fitting snugly therein, as shown in Figs. 3 and 5, or it may be grooved from front to rear to receive the narrow sections $A^2$ separately, when constructed as shown in Figs. 7 and 8.

The inner face of the sectional plates $A^1$, or of the concave where the teeth are applied separately, is provided with ribs or corrugations running transversely of the concave, as shown at $e$, Figs. 5 and 6.

The forms of the loops or staple-teeth may be varied from those shown, and the base-plates may be provided with interlocking tongues or spurs, adapting them to be held firmly in place each with a smaller number of bolts than would otherwise be required; but the form and arrangement described have been found exceedingly effective in operation, and are sufficient to show how the invention may be carried out in practice.

The base-plates in this arrangement are made to cover the entire face of the concave and form the wearing-surface thereof, and being made light and easily removable, when they become worn or the teeth become broken, they can be readily removed and new wear-plates substituted, or new teeth applied, as may be required, thus giving greatly-increased durability to the main concave or bed-plate.

Having now described my invention, what I claim as new, and desire to secure by Letters Patent, is—

1. The teeth made in loop or slotted form, and arranged in groups upon removable sectional wear or base plates, adapted to be applied to the main concave, substantially as described.

2. The teeth made in the form of loops or slotted plates, with the slots or openings and the stiffening-ribs, either or both, arranged obliquely to the face of the concave or concave-section, substantially as described.

JOSEPH ALLONAS.

Witnesses:
J. H. MILLER,
ALF. H. CRILEY.